United States Patent [19]

Scanlon et al.

[11] Patent Number: 4,673,002

[45] Date of Patent: Jun. 16, 1987

[54] FLEXIBLE FLUID FOR TRANSFERRING FLUIDS

[75] Inventors: John F. Scanlon, Roscoe; William D. Sherman, Genoa; Joel E. Oman, Rockford, all of Ill.

[73] Assignee: Sundstrand Corporation, Rockford, Ill.

[21] Appl. No.: 760,672

[22] Filed: Jul. 30, 1985

[51] Int. Cl.$^4$ .............................................. F16L 59/14
[52] U.S. Cl. ................................... 138/149; 138/103; 138/121; 138/113; 138/129
[58] Field of Search ............... 138/103, 121, 122, 129, 138/138, 139, 140, 149, 177, 178, 127, 113

[56] References Cited

U.S. PATENT DOCUMENTS

| | | | |
|---|---|---|---|
| 284,050 | 8/1883 | Nichols | 138/127 |
| 2,089,492 | 8/1937 | Lambert | 138/149 |
| 2,348,754 | 5/1944 | Ray | 138/149 |
| 2,934,095 | 4/1960 | Lockhart | 138/127 X |
| 3,155,117 | 11/1964 | Spillman | 138/149 |
| 3,558,391 | 1/1971 | Peyton et al. | 138/103 X |
| 4,161,231 | 7/1979 | Wilkinson | 138/149 X |
| 4,376,229 | 3/1983 | Maul et al. | 138/121 X |
| 4,582,094 | 4/1986 | Stausebousch | 138/149 X |

*Primary Examiner*—James E. Bryant, III
*Attorney, Agent, or Firm*—Wood, Dalton, Phillips, Mason & Rowe

[57] ABSTRACT

To transfer a fluid at high service temperature and pressure without the limitations of rigid tubing, a flexible tube is provided with a plurality of generally concentric tubular layers for transferring fluids. The innermost layers define a fluid flow path and provide insulation without pressure containment whereas the outermost layers provide fluid containment and resist pressure exerted by the fluid flowing through the tube. By utilizing a plurality of layers of different materials selected to have specific characteristics, the flexible tube operates at a service temperature and pressure providing a high level of energy transfer.

21 Claims, 3 Drawing Figures

FLEXIBLE FLUID FOR TRANSFERRING FLUIDS

FIELD OF THE INVENTION

This invention relates to a flexible tube for transferring fluids, and more specifically, to a flexible tube having a plurality of generally concentric layers.

BACKGROUND OF THE INVENTION

Transfer tubes for fluids such as high temperature gases have generally been constructed from nickel or cobalt based alloys. Tubes made from these materials conventionally have a sufficient wall thickness to retain the requisite strength characteristics for rigid tubing so as to withstand service temperatures and pressures. However, in many hot gas transfer applications, rigid transfer tubes are heavy and difficult to manufacture with sufficient wall thickness.

In a common application, energy in the form of heat and pressure is being transferred via a gas. It is recognized that transfer tubes capable of withstanding very high pressures and temperatures will accommodate a higher energy flow in a given amount of time but, unfortunately, unacceptable stresses can be placed on components which mate to rigid transfer tubes when the tubing expands as it is heated to high temperature by the gas being transferred. As a result, there has been an inability to increase efficiency significantly by transferring energy at very high temperatures and pressures.

In a typical example of interest, the energy transfer problem is found in hot gas tubes used to transfer exhaust products from hot gas generators to power gas hydraulic units. The exhaust products created by a hot gas generator are used to spin a turbine which, in turn, rotates an impeller used to pump fluid to provide motive force in a hydraulic system by means of a connecting shaft. Typically, the sizing of the hydraulic system is predicated on the temperature and pressure that can reliably be used to power the turbine.

Unfortunately, the weak link in most existing systems is the transfer tube. It is generally recognized that a transfer tube capable of withstanding greater temperatures and pressures would allow use of a smaller and lighter gas generator. In aerospace applications, where weight and space are at a premium, a savings of this type can be significant.

While overcoming the noted problems, it is also desirable to provide a flexible fluid transfer tube to facilitate installation. It is also desirable to provide a flexible fluid transfer tube that cannot only be used to carry hot gases under pressure, but can also be used to carry any gas or fluid which must be insulated and is typically transferred under pressure. Further, it is desirable to provide a flexible fluid transfer tube capable of either continuous or cyclical use.

Among the efforts to provide a flexible tube is that disclosed in Lockhart U.S. Pat. No. 2,934,095, issued Apr. 26, 1960 in which a flexible metal conduit is formed of a convoluted metal hose having a flexible liner of metal braid. However, Lockhart would not be suitable for preventing a loss of thermal energy from a fluid flowing through the conduit or providing thermal protection for the more highly stressed convoluted metal hose.

An attempt to provide a flexible fluid transfer tube useful over a range of temperatures is disclosed in Aubert et al. U.S. Pat. No. 4,344,462, issued Aug. 17, 1982. Aubert et al. discloses a flexible tubular conduit indicated to be usable from $-160°$ C. to $+500°$ C. by utilizing an insulating material between layers of the conduit. However, once again, there are limitations on the degree to which the Aubert et al. flexible tubular conduit is useful in transferring a fluid requiring insulation.

Among other attempts to provide a flexible fluid transfer tube are those disclosed in U.S. Pat. Nos. 3,086,556; 3,460,579; 3,463,197; 3,725,167; 3,908,703; 4,104,095; 4,106,527; 4,106,528; 4,213,485; and 4,383,554.

The present invention is directed to overcoming the above stated problems and accomplishing the stated objects.

SUMMARY OF THE INVENTION

It is the principal object of the present invention to provide a new and improved flexible fluid transfer tube. More specifically, it is an object of the invention to provide a transfer tube which is well adapted for either continuous or cyclical use while providing a flexible, insulated flow path for carrying a gas or liquid under pressure. It is likewise an object of the invention to provide a flexible fluid transfer tube capable of being easily and inexpensively installed.

An exemplary embodiment of the invention achieves the foregoing objects in a flexible fluid transfer tube having a plurality of generally concentric tubular layers.

The inner layer defines a fluid flow path formed of a flexible fluid transfer material which is at least partially fluid permeable. The inner layer is surrounded by a first intermediate layer formed of a flexible insulating material which is also at least partially fluid permeable. The first intermediate layer is surrounded by a second intermediate layer formed of a flexible fluid containing material which is substantially fluid impermeable. Additionally, an outer layer formed of a flexible fluid pressure resisting material surrounds and reinforces the second intermediate layer.

In the exemplary embodiment, the flexible fluid transfer material of the inner layer is preferably a metal fiber braided to define the fluid flow path and provide a flexible form for the remainder of the generally tubular layers. Alternatively, it can be formed of a metal strip which is helically wound and interlocked but, in either case, the inner layer is in a balanced fluid pressure condition when a fluid is being transferred through the flexible fluid transfer tube due to the fact that it is at least partially fluid permeable. Moreover, it protects the first intermediate layer from flow damage and/or abrasion or erosion from the fluid and any particles contained therein.

Additionally, the flexible insulating material of the first intermediate layer is preferably a ceramic fiber braided to provide insulation about the inner layer. In the preferred embodiment, the first intermediate layer includes a plurality of layers of the braided ceramic fiber, depending upon the particular application and the corresponding insulation required. As with the inner layer, the first intermediate layer is in a balanced fluid pressure condition when a fluid is being transferred through the flexible fluid transfer tube due to the fact that it, too, is at least partially fluid permeable.

Further, the flexible fluid containing material of the second intermediate layer is preferably a fluid compatible non-metallic material formed as a hollow and continuous tube to provide fluid containment. While the fluid is permitted to migrate through the inner layer and the first intermediate layer due to the partially fluid permeable nature of the materials used for these layers, the fluid is contained by the second intermediate layer. As a result, the second intermediate layer is in an unbalanced fluid pressure condition when a fluid is being transferred through the flexible fluid transfer tube due to the fact that it is substantially fluid impermeable.

In an alternative embodiment, the flexible fluid containing material of the second intermediate layer is a fluid compatible metallic material formed as a continuous convoluted hollow tube to provide fluid containment. The convoluted hollow tube may either directly surround the first intermediate layer or may be disposed in spaced relation to the first intermediate layer by spacer means preferably comprising a plurality of axially spaced woven ceramic spacers. With this construction, the woven ceramic spacers cooperate with the first intermediate layer to provide additional insulation by means of the air gap between the first and second intermediate layers.

Finally, the flexible fluid pressure resisting material of the outer layer is preferably a high strength metallic or non-metallic material. In either case, the high strength material is braided to provide fluid pressure containment by fluid acting against the second intermediate layer. Specifically, the outer layer cooperates with the second intermediate layer to resist pressure when a fluid is being transferred through the flexible fluid transfer tube.

Other objects and advantages will become apparent from the following specification taken in connection with the accompanying drawings.

DESCRIPTION OF THE PREFERRED EMBODIMENTS

Figure 1:
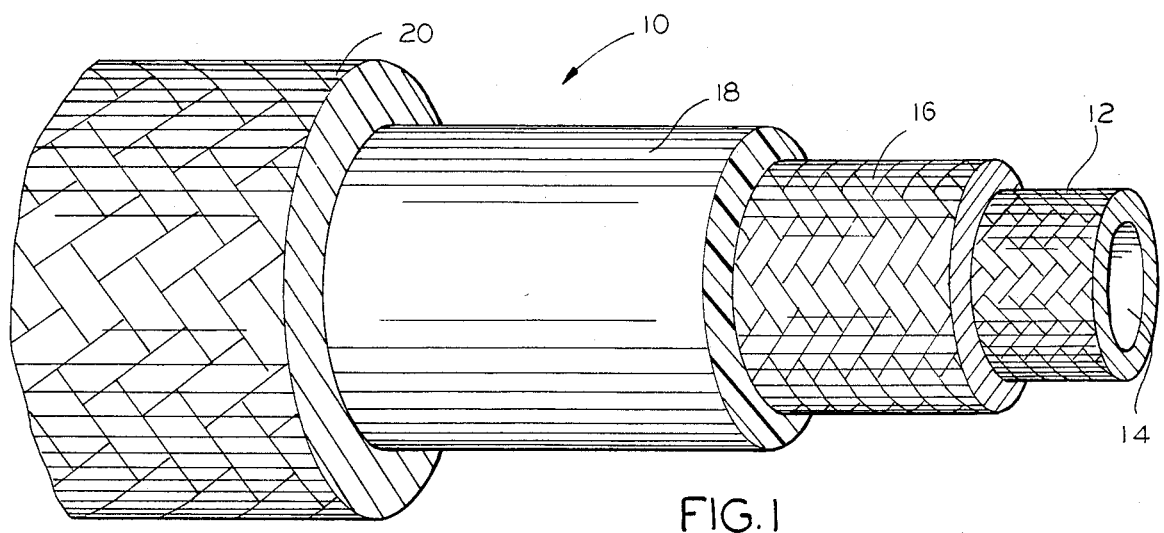
FIG. 1 is a side elevational view, partially in section and with portions broken away, illustrating a flexible fluid transfer tube in accordance with the present invention.

An exemplary embodiment of a flexible fluid transfer tube having a plurality of generally concentric tubular layers in accordance with the invention is illustrated in FIG. 1. The tube 10 includes an inner layer 12 formed of a flexible fluid transfer material defining a fluid flow path as at 14, and the material is such that the inner layer 12 is at least partially fluid permeable. A first intermediate layer 16 formed of a flexible insulating material surrounds the inner layer 12, and the material of the first intermediate layer 16 is also at least partially fluid permeable. A second intermediate layer 18 formed of a flexible fluid containing material surrounds the first intermediate layer 16, and the material of the second intermediate layer is substantially fluid impermeable. The tube 10 also includes an outer layer 20 formed of a flexible fluid pressure resisting material surrounding the second intermediate layer 18, and the material is such that the outer layer 20 structurally reinforces the second intermediate layer 18. With the arrangement illustrated in FIG. 1, the tube 10 is suited for transferring a fluid under pressure in insulated fashion to maintain its energy transferring capability.

Still referring to FIG. 1, the flexible fluid transfer material of the inner layer 12 is preferably a metal fiber braided to define the fluid flow path 14 and to provide a flexible form for the remainder of the generally tubular layers 16, 18 and 20. Where the flexible fluid transfer tube 10 is utilized to transfer a high temperature gas, the braided tube comprising the inner layer 12 is preferably formed of a high temperature metal such as that sold under the trademark Inconel. In any event, the braided metal fiber causes the inner layer 12 to be in a balanced fluid pressure condition when a fluid is being transferred through the flexible fluid transfer tube 10 due to the fact that the inner layer 12 is at least partially fluid permeable, i.e., no fluid pressure is contained by the inner layer 12.

Additionally, the flexible insulating material of the first intermediate layer 16 is preferably a ceramic or glass fiber braided to provide insulation about the inner layer 12. In the preferred embodiment, the first intermediate layer 16 of the flexible fluid transfer tube 10 includes a plurality of layers of the braided ceramic fiber formed of a material such as that sold under the trademark Nextel with the exact number of layers depending upon the fluid being transferred through the tube 10 and the insulation characteristics required for a given application. As with the flexible fluid transfer material of the inner layer 12, the braided ceramic fiber causes the first intermediate layer 16 to be in a balanced fluid pressure condition due to the fact that the first intermediate layer 16 is at least partially fluid permeable, i.e., a small amount of fluid equalizes pressure on both sides of the first intermediate layer 16.

With regard to the flexible fluid containing material of the second intermediate layer 18, it is preferably a fluid compatible non-metallic material formed as a continuous hollow tube to provide fluid containment. As illustrated in FIG. 1, the tube comprising the second intermediate layer 18 is a high temperature synthetic material such as that sold under the trademark Teflon which prevents penetration of the small amount of fluid that migrates through the inner layer 12 and the first intermediate layer 16 to the inner surface of the second intermediate layer 18. With this characteristic, the continuous hollow tube defined by the flexible fluid containing material causes the second intermediate layer 18 to be in an unbalanced fluid pressure condition when a fluid is being transferred through the flexible fluid transfer tube 10 due to the fact that the second intermediate layer 18 is substantially fluid impermeable, i.e, fluid pressure on the inner surface of the second intermediate layer 18 is greater than the exterior ambient pressure.

Referring to the outer layer 20 of the flexible fluid transfer tube 10, it is preferably formed of a braided high strength flexible fluid pressure load resisting material formed as a sleeve to provide fluid pressure load containment. This braided sleeve can either be formed of a high strength non-metallic fiber such as that sold under the trademark Kevlar or a high strength stainless steel or other metallic fiber. In either case, the braided high strength sleeve cooperates with the second intermediate layer 18 to resist pressure loading when a fluid is being transferred through the flexible fluid transfer tube 10.

With the structure and materials of FIG. 1, the service temperature of the inner layer 12 and the first intermediate layer 16 is in excess of 2200° F. In contrast, the service temperature of the second intermediate layer 18 is limited to approximately 500° F. As a result, FIG. 1 is a flexible fluid transfer tube best suited for repeated short time duration hot fluid cycles.

In a typical operation utilizing the tube 10, a high temperature and pressure gas enters the tube 10 for transfer along the fluid flow path 14. A small amount of gas permeates through the tightly braided metal fiber inner layer 12 and the surrounding braided ceramic layer or layers comprising the first intermediate layer 16 to ensure that the inner layer 12 and the first intermediate layer 16 are not containing pressure but rather are simply providing a flow path in the case of the inner layer 12 and insulation in the case of the first intermediate layer 16. As the small amount of gas migrates through the inner layer 12 and the first intermediate layer 16, it loses energy and cools down so that, when the gas reaches the second intermediate layer 18, it is at an actual temperature below the service temperature of the second intermediate layer 18.

Moreover, when the gas reaches the inner surface of the second intermediate layer 18, the second intermediate layer 18 is forced against the braided outer sleeve comprising the outer layer 20. This occurs as a result of the difference in pressure between the gas flowing through the flexible fluid transfer tube 10 and exterior ambient pressure. As discussed above, the outer layer 20 provides fluid pressure containment, i.e., the strength to withstand the internal pressure of the gas flowing through the tube 10.

As will be clear from the above description, the flexible fluid transfer tube 10 is particularly well suited for repeated short time duration hot gas cycles. The exact temperature of the gas to be transferred is inversely proportional to the time length of the cycle due to the limited service temperature of the second intermediate layer 18. As will be appreciated, the temperature at the second intermediate layer 18 will build up over time.

Figure 2:
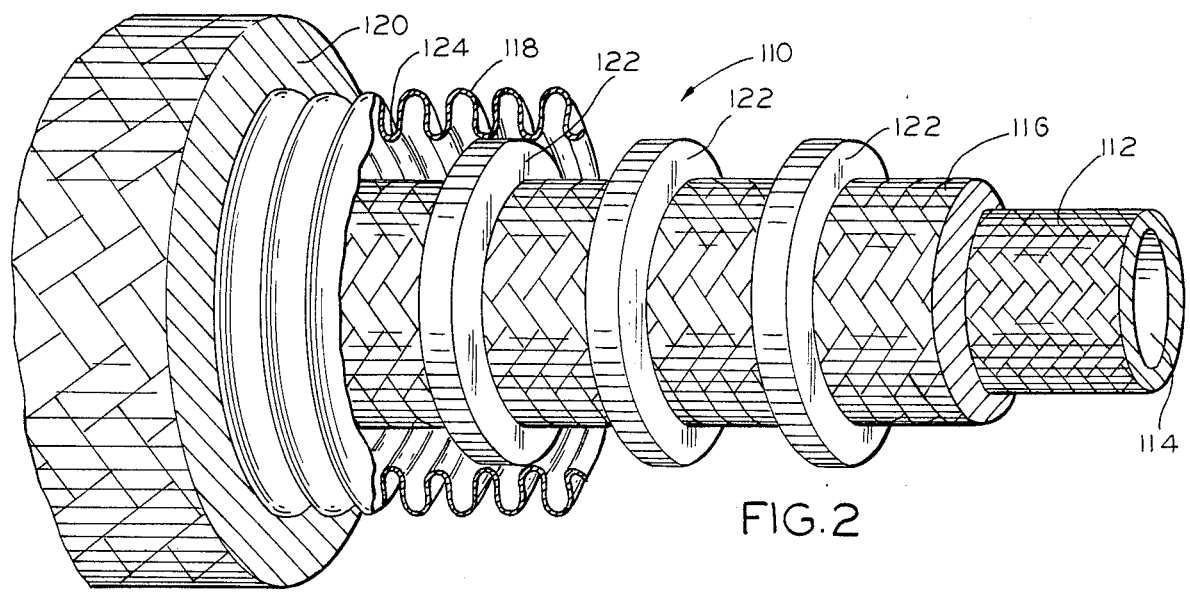
FIG. 2 is a side elevational view similar to FIG. 1 illustrating another embodiment.

Referring to FIG. 2, another embodiment of the present invention is illustrated. The flexible fluid transfer tube 110 also includes an inner layer 112 formed of a flexible fluid transfer material defining a fluid flow path 114, and the inner layer 112 is again at least partially fluid permeable. A first intermediate layer 116 formed of a flexible insulating material surrounds the inner layer 112, and the first intermediate layer 116 is also again at least partially fluid permeable. A second intermediate layer 118 formed of a fluid containing material surrounds the first intermediate layer 116, and the second intermediate layer 118 is again substantially fluid impermeable. The flexible fluid transfer tube 110 also includes an outer layer 120 formed of a flexible fluid pressure load resisting material surrounding the second intermediate layer 118, and the outer layer 120 again reinforces the second intermediate layer 118. With this arrangement, the flexible fluid transfer tube 110 is particularly well suited for continuous fluid transfer applications.

Still referring to FIG. 2, the flexible fluid containing material of the second intermediate layer 118 is preferably a fluid compatible metallic material formed as a continuous convoluted hollow tube to provide fluid containment. It will be seen that the second intermediate layer 118 is maintained in spaced relation to the first intermediate layer 116 by spacer means such as a plurality of axially spaced woven ceramic spacers 122 disposed between the first and second intermediate layers 116 and 118. As illustrated, the woven ceramic spacers 122 cooperate with the first intermediate layer 116 and the second intermediate layer 118 to provide additional insulation in the form of an air gap as at 124.

With this construction, the woven ceramic spacers 122 help to insulate the second intermediate layer 118 and the outer layer 120 from a high temperature gas flowing along the fluid flow path 114. In particular, the spacers 122 cooperate with the first intermediate layer 116 to provide insulation in addition to that provided by the first intermediate layer 116 between the second intermediate layer 118 and the fluid flow path 114. Accordingly, the flexible fluid transfer tube 110 is capable of continuous use at very high temperatures and, if desired, can be provided with another intermediate layer such as 116 between the spacers 122 and the second intermediate layer 118.

As shown, the inner layer 112 and the first intermediate layer 116 are essentially identical to the inner layer 12 and the first intermediate layer 16 of the embodiment illustrated in FIG. 1. The second intermediate layer 118 is quite different, however, in that it comprises a thin wall convoluted tube preferably formed from a high temperature metal such as that sold under the trademark Inconel which provides flexibility to the tube 110 and also provides fluid containment, i.e., prevents the escape of fluid from the tube 110. Finally, the outer layer 120 is essentially identical to the outer layer 20 in the embodiment illustrated in FIG. 1.

In a typical application for the tube 110, a hot, pressurized gas is directed along the fluid flow path 114 by the inner layer 112. A small amount of the gas migrates through the inner layer 112 and the first intermediate layer 116 into the dead air space between the first intermediate layer 116 and the second intermediate layer 118. When pressure in the dead air space 124 equalizes with that in the fluid flow path 114, migration of gas molecules essentially ceases to occur.

At this point, the convoluted tube defining the second intermediate layer 118 prevents escape of gas from the flexible fluid transfer tube 110 and the braided high strength sleeve defining the outer layer 120 provides pressure load containment for the gas flowing through the flexible fluid transfer tube 110. As mentioned, the embodiment illustrated in FIG. 2 is particularly well suited as a hot gas transfer tube for continuous use at very high temperatures and is also capable of repeated continuous use in hot gas cycle applications. By selecting the number of layers of braided ceramic fiber 116, the strength and wall thickness of the convoluted tube 118, and the strength and wall thickness of the braided high strength sleeve 120, the flexible fluid transfer tube 110 can be constructed to have specific temperature and pressure limits to meet a given application.

Figure 3:
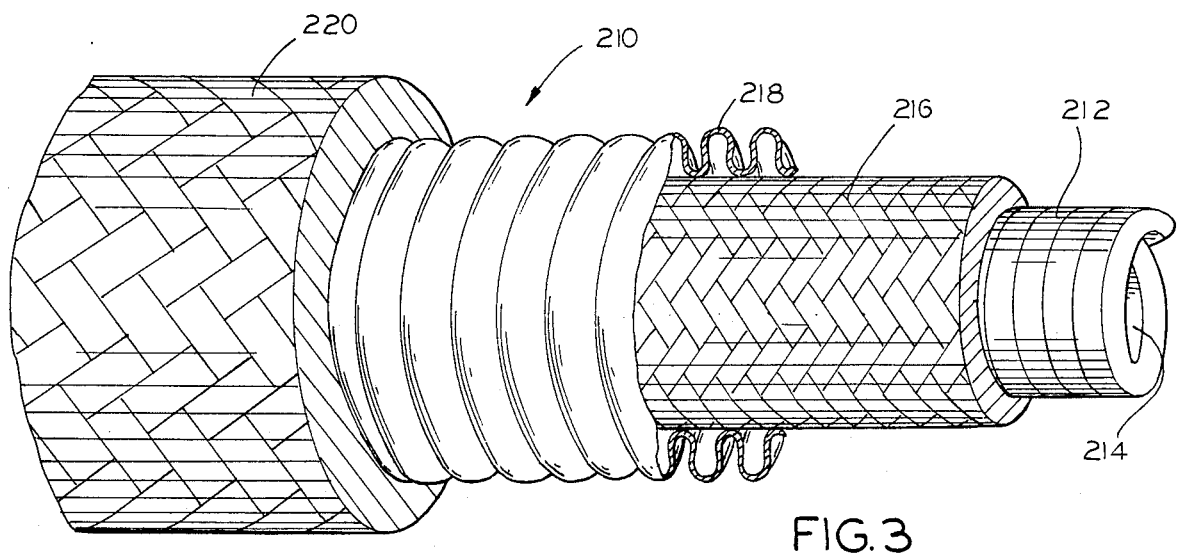
FIG. 3 is a side elevational view similar to FIG. 1 illustrating still another embodiment.

Referring now to FIG. 3, another embodiment of flexible fluid transfer tube 210 is illustrated. The first intermediate layer 216 and the outer layer 220 are preferably identical to the corresponding layers 16 and 20 in the embodiment illustrated in FIG. 1 and 116 and 120 in the embodiment illustrated in FIG. 2, and the second intermediate layer 218 is preferably identical to the corresponding layer 118 in FIG. 2. However, the inner layer 212 defining the fluid flow path 214 is entirely distinct.

In particular, the flexible fluid transfer material of the inner layer 212 is preferably a metal strip helically wound to define the fluid flow path 214 and to provide a flexible form for the remainder of the generally tubular layers 216, 218 and 220. However, as with the inner layers 12 and 112, the helically wound metal strip causes the inner layer 212 to be in a balanced fluid pressure condition when a fluid is being transferred through the flexible fluid transfer tube 210 due to the fact that the inner layer 212 is at least partially fluid permeable. Nevertheless, this helically wound metal strip comprising the inner layer 212 restricts bending motion sufficiently to prevent collapse of the inner layer 212 as might otherwise occur with the inner layers 12 and 112. As will also be appreciated, the inner layer 212 provides a relatively smooth surface minimizing pressure drop.

In addition, the second intermediate layer 218 can be formed of a thin walled convoluted metal tube. Unlike the second intermediate layer 118, however, the tube 218 is in direct contact with the first intermediate layer 216 rather than being disposed in spaced relation by means of woven ceramic spacers. Nevertheless, as with the second intermediate layer 118, the second intermediate layer 218 is preferably formed of a fluid compatible metallic material to provide fluid containment.

In the embodiment illustrated in FIG. 3, the inner layer 212 is preferably formed of helically wound stainless steel. It is also desirable for the second intermediate layer 218 to be formed of thin walled convoluted stainless steel. In other respects, the flexible fluid transfer tube 210 can be essentially identical to the tube 10 embodiment illustrated in FIG. 1.

While various embodiments of flexible fluid transfer tube have been described as transferring hot gases, it will be appreciated that the tubes are well suited for carrying any fluid, i.e., liquid or gas. It will also be appreciated that the precise materials to be utilized are dependent upon the temperature, pressure and chemical compatibility of the fluid, whether liquid or gas, in any particular application. Moreover, the flexible fluid transfer tube is useful for transferring any fluid, whether hot or cold, whether or not it is desirable to maintain the temperature of the fluid by insulating it from the external environment.

While in the foregoing there have been set forth preferred embodiments of the invention, it is to be understood that the invention is only to be limited by the spirit and scope of the appended claims.

We claim:

1. A flexible tube having a plurality of generally concentric tubular layers for transferring fluids under pressure at high temperatures, comprising:
   an inner layer formed of a flexible material defining a fluid flow path for transferring fluids, said inner layer being sufficiently fluid permeable so as to causes said inner layer to be in a balanced fluid pressure condition when a fluid is being transferred through said tube;
   a first intermediate layer formed of a flexible insulating material surrounding said inner layer, said first intermediate layer being sufficiently fluid permeable so as to cause said first intermediate layer to be in a balanced fluid pressure condition when a fluid is being transferred through said tube;
   a second intermediate layer formed of a flexible material surrounding said first intermediate layer for containing fluids, said second intermediate layer being substantially fluid impermeable so as to cause said second intermediate layer to be in an unbalanced fluid pressure condition when a fluid is being transferred through said tube;
   said insulating material causing fluid between said first and second intermediate layers to be at a lower temperature than fluid between said first intermediate layer and said inner layer, said fluid between said first and second intermediate layers being at a greater pressure than the pressure externally of said second intermediate layer; and
   an outer layer formed of a flexible load resisting material surrounding said second intermediate layer for resisting fluid pressure, said outer layer structurally reinforcing said second intermediate layer to withstand the pressure of said fluid between said first and second intermediate layers so as to provide fluid pressure containment.

2. The flexible tube as defined by claim 1 wherein said flexible material of said inner layer is a metal fiber, said metal fiber being braided to provide a flexible form for the remainder of said generally concentric tubular layers and to define said fluid flow path, said braided metal fiber causing said inner layer to be in a balanced fluid pressure condition when a fluid is being transferred through said flexible tube.

3. The flexible tube as defined by claim 1 wherein said flexible material of said inner layer is a metal strip, said metal strip being helically wound to provide a flexible form for the remainder of said generally concentric tubular layers and to define said fluid flow path, said helically wound metal strip causing said inner layer to be in a balanced fluid pressure condition when a fluid is being transferred through said flexible tube.

4. The flexible tube as defined by claim 1 wherein said flexible insulating material of said first intermediate layer is a ceramic fiber, said ceramic fiber being braided to provide insulation about said inner layer, said braided ceramic fiber causing said first intermediate layer to be in a balanced fluid pressure condition when a fluid is being transferred through said flexible tube.

5. The tube as defined by claim 4 wherein said first intermediate layer includes a plurality of layers of said braided ceramic fiber.

6. The flexible tube as defined by claim 1 wherein said flexible material of said second intermediate layer is a fluid compatible non-metallic material, said fluid compatible non-metallic material being formed as a continuous hollow tube to provide fluid containment, said continuous hollow tube being in an unbalanced fluid pressure condition when a fluid is being transferred through said flexible tube.

7. The flexible tube as defined by claim 1 wherein said flexible material of said second intermediate layer is a fluid compatible metallic material, said fluid compatible metallic material being formed as a continuous convoluted hollow tube to provide fluid containment, said continuous convoluted hollow tube being in an unbalanced fluid pressure condition when a fluid is being transferred through said flexible tube.

8. The flexible tube as defined by claim 7 including spacer means disposed between said first and second intermediate layers, said spacer means maintaining said second intermediate layer in spaced relation to said first intermediate layer, said spacer means cooperating with said first intermediate layer to provide additional insulation between said second intermediate layer and said fluid flow path.

9. The flexible tube as defined by claim 8 wherein said spacer means comprises a plurality of axially spaced woven ceramic spacers.

10. The flexible tube as defined by claim 1 wherein said flexible material of said outer layer is a high strength non-metallic material, said high strength non-metallic material being braided to provide fluid pressure load containment, said braided high strength non-metallic material cooperating with said second intermediate layer to resist pressure load when a fluid is being transferred through said flexible tube.

11. The flexible tube as defined by claim 1 wherein said flexible material of said outer layer is a high strength metallic material, said high strength metallic material being braided to provide fluid pressure load containment, said braided high strength metallic material cooperating with said second intermediate layer to resist pressure load when a fluid is being transferred through said flexible tube.

12. A flexible high temperature and pressure tube formed having generally concentric tubular layers for transferring fluids under pressure at high temperatures, comprising:
   an inner layer formed of a flexible material defining a fluid flow path for transferring fluids, said inner layer being at least partially fluid permeable, said flexible material being a metal fiber, said metal fiber being braided to provide a flexible form for the remainder of said generally tubular layers and to define said fluid flow path, said braided metal fiber causing said inner layer to be at least partially fluid permeable so as to be in a balanced fluid pressure condition when a fluid is being transferred through said flexible tube;
   a first intermediate layer formed of a flexible insulating material surrounding said inner layer, said first intermediate layer being at least partially fluid permeable, said flexible insulating material being a ceramic fiber, said ceramic fiber being braided to provide insulation about said inner layer, said braided ceramic fiber causing said first intermediate layer to be at least partially fluid permeable so as to be in a balanced fluid pressure condition when a fluid is being transferred through said flexible tube;
   a second intermediate layer formed of a flexible material surrounding said first intermediate layer for containing fluids, said second intermediate layer being substantially fluid impermeable so as to cause said fluid to be an unbalanced fluid pressure condition when a fluid is being transferred through said flexible tube;
   said insulating material causing fluid between said first and second intermediate layers to be at a lower temperature than fluid between said first intermediate layer and said inner layer, said fluid between said first and second intermediate layers being at a greater pressure than the pressure externally of said second intermediate layer; and
   an outer layer formed of a flexible load resisting material surrounding said second intermediate layer for resisting fluid pressure, said outer layer reinforcing said second intermediate layer to withstand the pressure of said fluid between said first and second intermediate layers so as to provide fluid pressure containment.

13. The flexible tube as defined by claim 12 wherein said flexible material of said second intermediate layer is a fluid compatible non-metallic material, said fluid compatible non-metallic material being formed as a continuous hollow tube to provide fluid containment, said continuous hollow tube causing said second intermediate layer to be substantially fluid impermeable so as to be in an unbalanced fluid pressure condition when a fluid is being transferred through said flexible tube.

14. The flexible tube as defined by claim 12 wherein said flexible material of said second intermediate layer is a fluid compatible metallic material, said fluid compatible metallic material being formed as a continuous convoluted hollow tube to provide fluid containment, said continuous convoluted hollow tube causing said second intermediate layer to be substantially fluid impermeable so as to be in an unbalanced fluid pressure condition when a fluid is being transferred through said flexible tube.

15. The flexible tube as defined by claim 14 including spacer means disposed between said first and second intermediate layers, said spacer means maintaining said second intermediate layer in spaced relation to said first intermediate layer, said spacer means cooperating with said first intermediate layer to provide additional insulation between said second intermediate layer and said fluid flow path.

16. The flexible tube as defined by claim 12 wherein said flexible material of said outer layer is a high strength non-metallic material, said high strength non-metallic material being braided to provide fluid pressure containment, said braided high strength non-metallic material causing said outer layer to reinforce said second intermediate layer so as to resist pressure when a fluid is being transferred through said flexible tube.

17. The flexible tube as defined by claim 12 wherein said flexible material of said outer layer is a high strength metallic material, said high strength metallic material being braided to provide fluid pressure containment, said braided high strength metallic material causing said outer layer to reinforce said second intermediate layer so as to resist pressure load when a fluid is being transferred through said flexible tube.

18. A flexible high temperature and pressure tube formed having generally concentric tubular layers for transferring fluids, comprising:
   an inner layer formed of a flexible material defining a fluid flow path for transferring fluids, said inner layer being at least partially fluid permeable, said flexible material being a metal strip, said metal strip being helically wound to provide a flexible form for the remainder of said generally tubular layers and to define said fluid flow path, said helically wound metal strip causing said inner layer to be at least partially fluid permeable so as to be in a balanced fluid pressure condition when a fluid is being transferred through said flexible tube;
   a first intermediate layer formed of a flexible insulating material surrounding said layer, said first intermediate layer being at least partially fluid permeable, said flexible insulating material being a ceramic fiber, said ceramic fiber being braided to provide insulation about said inner layer, said braided ceramic fiber causing said first intermediate layer to be at least partially fluid permeable so as to be in a balanced fluid pressure condition when a fluid is being transferred through said flexible tube;
   a second intermediate layer formed of a flexible material surrounding said first intermediate layer for containing fluids, said second intermediate layer being substantially fluid impermeable so as to cause said second intermediate layer to be in an unbalanced fluid pressure condition when a fluid is being transferred through said flexible tube;
   said insulating material causing fluid between said first and second intermediate layers to be at a lower temperature than fluid between said first intermediate layer and said inner layer, said fluid between said first and second intermediate layers being at a greater pressure than the pressure externally of said second intermediate layer; and an outer layer formed of a flexible load resisting material surrounding said second intermediate layer for resisting fluid pressure, said outer layer reinforcing said second intermediate layer to withstand the pressure of said fluid between said first and second intermediate layers so as to provide fluid pressure containment.

19. The flexible tube as defined by claim 18 wherein said flexible material of said second intermediate layer is a fluid compatible metallic material, said fluid compatible metallic material being formed as a continuous convoluted hollow tube to provide fluid containment, said continuous convoluted hollow tube causing said second intermediate layer to be substantially fluid impermeable so as to be in an unbalanced fluid pressure condition when a fluid is being transferred through said flexible tube.

20. The flexible tube as defined by claim 18 wherein said flexible material of said outer layer is a high strength non-metallic material, said high strength non-metallic material being braided to provide fluid pressure containment, said braided high strength non-metallic material causing said outer layer to reinforce said second intermediate layer so as to resist pressure load when a fluid is being transferred through said flexible tube.

21. The flexible tube as defined by claim 18 wherein said flexible material of said outer layer is a high strength metallic material, said high strength metallic material being braided to provide fluid pressure load containment, said braided high strength metallic material causing said outer layer to reinforce said second intermediate layer so as to resist pressure load when a fluid is being transferred through said flexible tube.

* * * * *